US011115870B2

(12) United States Patent
Karimli et al.

(10) Patent No.: US 11,115,870 B2
(45) Date of Patent: Sep. 7, 2021

(54) SERVICE-AWARE UTILIZATION OF SHARED WIRELESS RESOURCES

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 176 days.

(21) Appl. No.: 16/224,751

(22) Filed: Dec. 18, 2018

(65) Prior Publication Data
US 2020/0196197 A1    Jun. 18, 2020

(51) Int. Cl.
| | |
|---|---|
| *H04W 28/22* | (2009.01) |
| *H04W 28/24* | (2009.01) |
| *H04W 28/02* | (2009.01) |
| *H04W 4/44* | (2018.01) |
| *H04L 12/801* | (2013.01) |
| *H04W 72/04* | (2009.01) |
| *H04W 4/10* | (2009.01) |
| *H04L 29/06* | (2006.01) |

(52) U.S. Cl.
CPC .............. *H04W 28/22* (2013.01); *H04L 47/14* (2013.01); *H04L 65/1016* (2013.01); *H04W 4/10* (2013.01); *H04W 4/44* (2018.02); *H04W 28/0231* (2013.01); *H04W 28/24* (2013.01); *H04W 72/0453* (2013.01)

(58) Field of Classification Search
CPC . H04W 28/22; H04W 28/24; H04W 28/0231; H04W 4/44; H04W 72/0453; H04W 4/10; H04W 16/14; H04W 72/087; H04L 47/14; H04L 65/1016; H04L 65/1069; H04L 65/80
See application file for complete search history.

(56) References Cited

U.S. PATENT DOCUMENTS

| | | | | |
|---|---|---|---|---|
| 2006/0198347 A1* | 9/2006 | Hurtta | .................... | H04W 28/16 370/338 |
| 2011/0286343 A1* | 11/2011 | Powell | .................. | H04W 76/10 370/252 |
| 2017/0222746 A1* | 8/2017 | Kang | ................. | H04W 72/0453 |
| 2019/0223069 A1* | 7/2019 | Wong | ...................... | H04W 8/18 |

* cited by examiner

*Primary Examiner* — Pao Sinkantarakorn
*Assistant Examiner* — Kabir U Jahangir
(74) *Attorney, Agent, or Firm* — Lee & Hayes, P.C.

(57) ABSTRACT

Systems, methods, and devices can be used to perform service-aware utilization of shared wireless resources. In various instances, a quality metric (e.g., a Bit Error Rate (BER)) of a shared wireless resource is determined. Requested services can be provided based at least partly on the quality metric and the type of services being requested. For example, when the quality metric exceeds a threshold and the requested services are for Quality of Service (QoS)-sensitive services (e.g., Guaranteed Bit Rate (GBR) services), the services can be provided at least partially via a licensed wireless resource. However, when the quality metric does not exceed the threshold, and/or the requested services are for non-QoS-sensitive services (e.g., non-GBR services), the services can be provided via the shared wireless resource.

18 Claims, 4 Drawing Sheets

SERVICE-AWARE UTILIZATION OF SHARED WIRELESS RESOURCES

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

Traditionally, service providers have obtained licenses to conduct wireless communications in a particular range of frequencies, and accordingly, have programmed base stations in a wireless network to use a fixed set of frequency resources. However, a number of user devices has grown over time, greatly increasing an amount of wireless traffic to be handled by the wireless networks.

The Citizens Broadband Radio Service (CBRS) enables shared wireless broadband use of the 3550-3700 megahertz (MHz) band (3.5 gigahertz (GHz) band). Historically, a portion of the CBRS band has been used by the United States Navy, satellite service providers, and utilities. However, the CBRS band has recently been availed for new commercial mobile uses.

CBRS is governed by a three-tiered spectrum authorization framework to accommodate a variety of commercial uses on a shared basis with incumbent users of the 3.5 GHz band. The three-tiered spectrum authorization framework provides Incumbent Access users priority access over Priority Access users, and Priority Access users priority access over General Authorized Access users. Incumbent Access users include authorized federal and grandfathered Fixed Satellite Service users. The Federal Communications Commission has implemented rules protecting such users from harmful interference from Priority Access and General Authorized Access users. That is, Incumbent Access users have priority access to the 3.5 GHz band. Priority Access users are granted access to the 3.5 GHz band via a Priority Access License assigned using competitive bidding within the 3550-3650 MHz portion of the 3.5 GHz band. General Authorized Access users are granted access via a licensed-by-rule, which permits open, flexible access to any portion of the 3550-3700 MHz band, so long as the portion of the 3550-3700 MHz band is not assigned to a higher tier (e.g., Incumbent Access or Priority Access). In some situations, access to the CBRS can be controlled, at least in part, by a Spectrum Access System (SAS), which may utilize rules to protect the rights of Incumbent Access uses and Priority Access users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
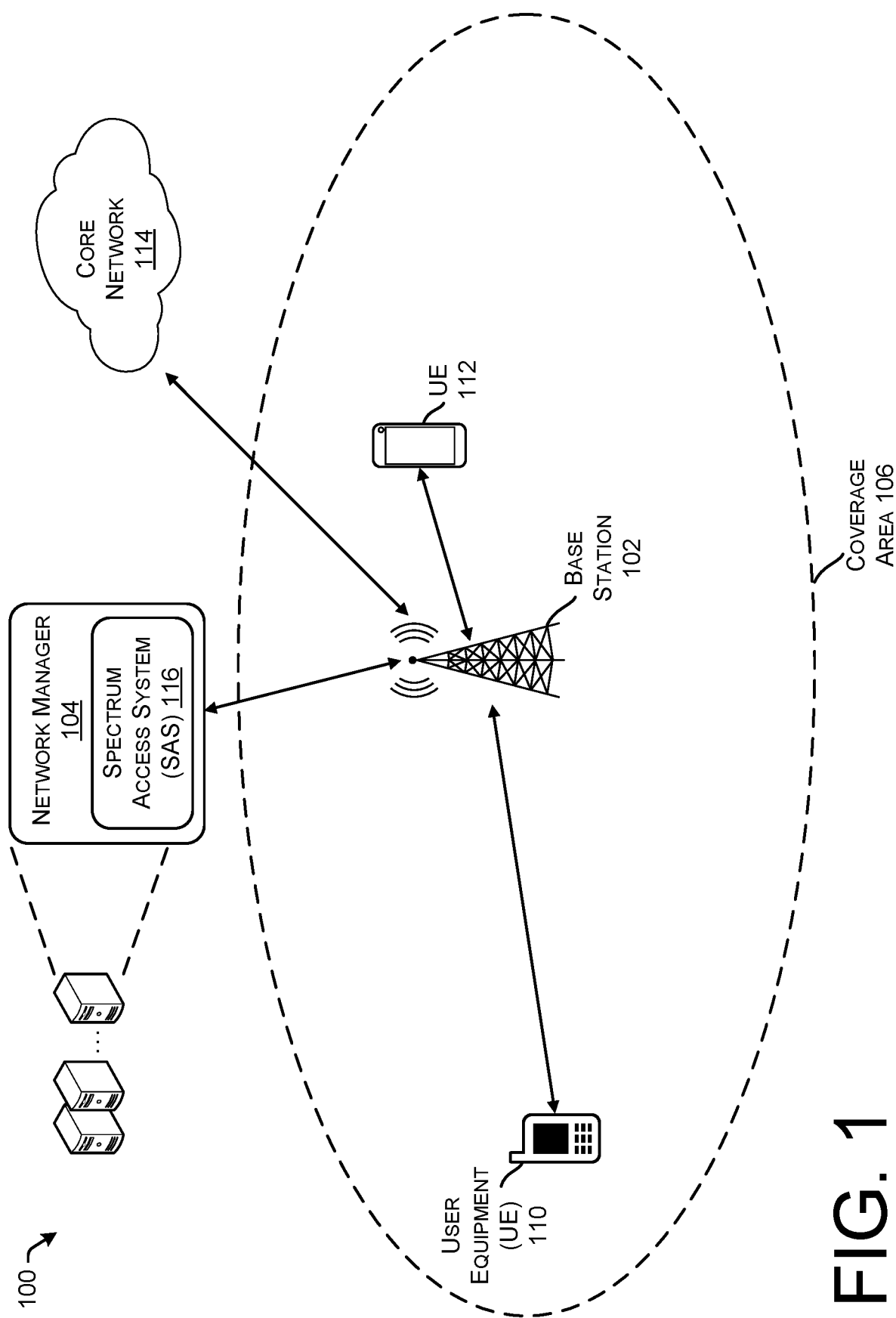
FIG. 1 illustrates an example environment including a base station implementing service-aware utilization of shared wireless resources, a network manager, and user equipment (UEs).

The systems, devices, and techniques described herein relate to service-aware utilization of shared and licensed wireless resources.

In various embodiments, a device responsible for managing network traffic routes both Quality-of-Service (QoS)-sensitive data traffic and non-QoS-sensitive data traffic over shared wireless resources (e.g., wireless resources in the CBRS band) when a quality metric (e.g., a Bit Error Rate (BER)) of the shared wireless resources is relatively low. However, when the quality metric is relatively high, the device selectively routes QoS-sensitive traffic at least partially over licensed wireless resources, while routing non-QoS-sensitive data traffic over the shared wireless resources. As a result, the device can preferentially direct traffic over shared wireless resources while reserving licensed wireless resources for QoS-sensitive data services when the quality metric is relatively high.

Embodiments of the present disclosure solve a number of problems in the field of wireless communication. One such problem is the overutilization of licensed wireless resources. When a mobile carrier, for example, routes all data traffic over wireless resources licensed by the mobile carrier, the licensed wireless resources are more likely to become congested. Routing at least some data traffic over shared wireless resources, as described in the present disclosure, addresses this problem by reducing demands on the licensed wireless resources.

Another problem solved by various embodiments of the present disclosure is the difficulty of maintaining an expected QoS when there is a relatively high demand for wireless resources. For example, data traffic transmitted over congested wireless resources can experience problems, such as noticeable latency, that negatively impact quality of experience. When the data traffic is not particularly QoS-sensitive, users are relatively unaffected by the congestion. However, when the data traffic is QoS-sensitive, users may noticeably experience latency or other issues associated with a poor quality of experience. Selectively reserving licensed wireless resources for GBR traffic, as described with respect to certain embodiments of the present disclosure, addresses this problem by reducing the likelihood that QoS-sensitive data traffic will be associated with a poor quality of experience. Embodiments of the present disclosure limit the use of licensed wireless resources without negatively impacting quality of experience.

Embodiments of the present disclosure improve the technological field of wireless communication in a variety of ways. Service-aware utilization of shared wireless resources, such as CBRS resources, reduces congestion of licensed wireless resources, improves overall quality of experience for users, and more efficiently uses the shared wireless resources. These and other improvements to the functioning of a computer and network are discussed herein.

The various functions, gateways, nodes, and components discussed herein can be implemented either as a network element on a dedicated hardware, as a software instance running on a dedicated hardware, or as a virtualized function instantiated on an appropriate platform, such as a cloud infrastructure.

The systems, devices, and techniques described herein can be implemented in a number of ways. Example implementations are provided below with reference to the following figures.

FIG. 1 illustrates an example environment 100 including a base station 102 implementing service-aware utilization of shared wireless resources and user equipment (UEs) 110 and 112.

The terms "base station," "access point (AP)," or their equivalents, can refer to one or more devices that can transmit and/or receive wireless services to and from one or more UEs in a coverage area. For example, a base station can be implemented as a variety of technologies to provide wired and/or wireless access to the network, as discussed herein. In some instances, a base station can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, a base station can include any number and type of transceivers and/or base stations representing any number and type of macrocells, microcells, picocells, or femtocells, for example, with any type or amount of overlapping coverage or mutually exclusive coverage.

The term "wireless resource," or its equivalents, may include a resource over which data can be transmitted wirelessly. A wireless resource can include at least one of one or more wireless bands, one or more channels, one or more sub-channels, one or more carriers, one or more sub-carriers, etc.

The term "wireless band," or its equivalents, can refer to a range of electromagnetic frequencies in electromagnetic spectrum that can be used for wireless communication. For example, a wireless band can include frequency resources in at least one of a CBRS band (e.g., a 3550-3700 MHz band), an LTE Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). In some instances, frequency resources in the range of 600 MHz-6000 MHz can be referred as "low-band" and "mid-band." In some instances, the frequency resources may include "millimeter wave" bands including, but not limited to 26 GHz, 28 GHz, 38 GHz, 60 GHz, and the like. The techniques discussed herein are applicable to any frequency resources and are not limited to those expressly recited above.

The base station 102 can be associated with coverage area 106. In some instances, the coverage area 106 can correspond to a geographic region where communications over first and second wireless bands are supported by the base station 102. For example, coverage area 106 is a region where communication over a shared and licensed wireless resources are supported by the base station 102.

The term "shared wireless resource," or its equivalents, can refer to wireless a resource that is at least partially reserved for shared use. The CBRS band is an example of a shared wireless resource, since resources (e.g., channels) in the CBRS band are shared by Incumbent Access users, Priority Access users, and General Authorized Access users. A shared wireless resource can be at least partially reserved or licensed. For example, channels in the CBRS band can be at least partially reserved for Incumbent Access users and Priority Access users, while still qualifying as shared wireless resources.

The term "licensed wireless resource," or its equivalents, can refer to a wireless resource that is at least partially reserved for use by licensee(s) and/or assignee(s). For example, a licensee can be authorized to use a licensed wireless resource in the U.S. by the Federal Communication Commission (FCC), but a non-licensee is not authorized to use the licensed wireless resource.

The term "unlicensed wireless resource," or its equivalents, can refer to a wireless resource that is unencumbered by licenses, and can be used by various unlicensed users.

Although coverage area 106 is illustrated as a single geographic region, in some embodiments, coverage area 106 includes multiple coverage areas corresponding respectively to multiple frequency bands. In some instances, lower frequency wireless resources can be transmitted over a broader coverage area than higher frequency wireless resources. For example, an area where base station 102 provides wireless coverage using a licensed LTE band may be larger than an area where base station 102 provides wireless coverage using the CBRS band, where the LTE band includes a lower range of electromagnetic frequencies than the CBRS band.

In some instances, the base station 102 may be associated with UEs 110 and 112, which are each located in coverage area 106. The terms "user equipment (UE)," "user device," "wireless communication device," "wireless device," "communication device," "mobile device," and "client device," can be used interchangeably to describe any UE that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of UEs can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

Because UEs 110 and 112 are located in the coverage area 106, the base station 102 can provide services to UEs 110 and 112 over wireless resources available to the base station 102. The base station 102 may be able to provide services to UEs 110 and 112 over shared wireless resources, licensed wireless resources, and/or unlicensed wireless resources. For example, the base station 102 can provide services to UEs 110 and 112 over available channels in a shared wireless resource, such as the CBRS band, and/or a licensed wireless resource, such as an LTE band.

A network manager 104 may be in communication with the base station 102 and may inform the base station 102 of available wireless resources in the coverage area 106. In some implementations, the network manager 104 may allocate wireless bands and/or channels that the base station 102 can use for wireless communication in the coverage area 106. An indication of the wireless bands allocated to the base station 102 can be communicated from the network manager 104 to the base station 102. For example, the network manager 104 may include, or be in communication with, a Spectrum Access System (SAS) 116, which can identify at least one available CBRS channel that is unused by Incumbent Access or Priority Access users in the coverage area 106 of the base station 102. Although not illustrated, network manager 104 can allocate available spectrum to multiple base stations including base station 102.

The network manager 104 can include functionality to monitor a use of the CBRS band by one or more of Incumbent Access users, Priority Access users, and General Authorized Access (GAA) users. For example, the network manager 104 can include a database indicating which wireless resources are used by which users (e.g., Incumbents, Priority, and General), at which times, and at which locations. In some instances, when a UE (e.g., UE 110) is in communication with the base station 102 via CBRS resources, the base station 102 can provide an indication to the network manger 104 that the UE is using particular CBRS resources, and accordingly, that the particular CBRS resources should not be allocated to another base station, or another user device.

In various embodiments, the base station 102 is configured to provide services between UEs (e.g., UEs 110 and 112) and a core network 114. As used herein, the term "core network," "carrier network, or their equivalents, can refer to an architectural framework for providing services to one or more UEs. A core network, for example, can provide services to a UE from a wide area network (WAN), such as the Internet. In some instances, core network is an IP Multimedia Subsystem (IMS) core (sometimes referred to as an "IMS core network," an "IMS network," a "Core Network (CN)," or an "IM CN Subsystem"). IMS is an architectural framework defined by the 3$^{rd}$ Generation Partnership Project (3GPP) for delivering Internet Protocol (IP) multimedia to a UE. The IMS core can be maintained and/or operated by one or more service providers, such as one or more wireless carriers ("carriers"), that provide IMS-based services to a user who is associated with the UE. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations, such as base station 102, and/or IMS nodes can be included in the IMS network.

An operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

In some embodiments, the base station 102 receives a request for services from a UE, e.g., UE 110. The base station 102 forwards the request to the core network 114. In response, the core network 114 returns the requested services, and the services are delivered to the UE 110 over one or more available wireless resources. The one or more available wireless resources may be part of wireless resources allocated to the base station 102 by the network manager 104. In some embodiments, the base station 102 provides both uplink (UL) and downlink (DL) services between the UE 110 and the core network 114 via one or more UL and DL wireless resources, e.g., channels. Accordingly, a base station 102 may "provide services" to a UE by receiving data from the UE over one or more UL resources and/or delivering data to the UE over one or more DL resources.

In response to receiving the request for services from a UE, e.g., UE 110 or 112, the base station 102 selects the one or more wireless resources based at least in part on the types of services requested by the UE. In various embodiments, the base station 102 selects the one or more wireless resources based on whether the UE is requesting Quality of Service (QoS)-sensitive services. The base station 102 may determine the requested services are QoS-sensitive services when they are sensitive to the effects of network congestion during transmission.

As used herein, the term "Quality of Service (QoS)-sensitive services," or its equivalents, can refer to services that are likely to be noticeably and negatively impacted when they are transmitted over relatively low-performance wireless resources. QoS-sensitive services include, for example, lag-sensitive services such as conversational voice services. In some instances, QoS-sensitive services are predefined by a carrier according to trends in user expectations and user experience. For example, a carrier may define services associated with a particular mobile application (e.g., a baby monitor application, a conversational video application, a home alarm application, etc.) as QoS-sensitive services when customers of the carrier have indicated that they expect those services to be lag-, error-, and or outage-free. In some instances, the types of services requested by the UE are categorized into Guaranteed Bit Rate (GBR) or non-GBR services and are determined to be QoS-sensitive services when they are GBR services.

The term "GBR services," or its equivalents, can refer to a designation for services that are delivered via a guaranteed bandwidth or bit rate. GBR services may be QoS-sensitive services. For example, GBR services may include any of conversational voice services, conversational video (live streaming) services, real time gaming services, Vehicle-to-X (V2X) message electricity distribution services, process automation (monitoring) services, non-conversational video (buffered streaming) services, mission critical user plane Push to Talk (PTT) voice services, non-mission-critical user plane PTT voice services, mission critical video user plane services, and certain V2X message services. In some examples, GBR services may include different types of QoS-sensitive services.

The term "non-GBR services," or its equivalents, can refer to services that can be delivered via any available bandwidth or bit rate, or are otherwise not guaranteed a bandwidth or bit rate. Non-GBR services may be QoS-insensitive, or at least less QoS-sensitive than GBR services. For example, non-GBR services may include any of browsing services, Internet Protocol (IP) Multimedia Subsystem (IMS) signaling services, Transmission Control Protocol (TCP)-based video (buffered streaming) services, voice services, video (live streaming) services, interactive gaming services, Mission Critical delay sensitive signaling services, Mission Critical Data services, certain V2X message services, augmented reality services, and Low-latency Enhanced Mobile Broadband (eMBB) applications (TCP/User Datagram Protocol (UDP)-based) services. In some examples, non-GBR services may include different types of relatively QoS-insensitive services.

The base station 102 may also select the one or more wireless resources by which to provide the services based at least in part on by network conditions in the coverage area 106. The network conditions of the coverage area 106 are assessed by determining a quality metric associated with a wireless band in the coverage area 106. In some embodiments, the base station 102 determines a quality metric associated with a shared wireless band, such as a CBRS band.

As used herein, the term "quality metric," or its equivalents, can refer to a measurement of a wireless resource that indicates a performance of the wireless resource. For example, a quality metric of a wireless resource can be based at least in part on any of a Bit Error Rate (BER) of the wireless resource, a latency of the wireless resource, an inverse of throughput of the wireless resource, an inverse of a goodput of the wireless resource, a transmission delay of the wireless resource, a congestion level of the wireless resource, and any other measurement of the performance of the wireless resource. In some instances, a quality metric of a wireless band can be a quality metric of a single channel in the wireless band, an average quality metric of multiple channels in the wireless band, an aggregate quality metric of multiple channels in the wireless band, or a combination thereof.

The term "BER," or its equivalents, can refer to a rate at which errors occur in one or more data streams over one or more data channels. For example, the BER of a specific wireless band can be a BER measured over one channel in the specific wireless band, an average BER of multiple channels in the specific wireless band, an aggregate BER over multiple channels in the specific wireless band, or any other BER-related metric of the shared wireless band.

The quality metric can indicate whether the shared wireless band is relatively congested, overutilized, and/or inserting a certain level of noise into wireless transmissions. The quality metric can further be used to predict a future performance of the shared wireless band. In some instances, the base station 102 may further compare the quality metric to a particular threshold. For example, the base station 102 may determine whether the quality metric (e.g., a BER) of one or more channels in the shared wireless band exceeds a threshold.

In some embodiments, the base station 102 provides QoS-sensitive and non-QoS-sensitive services over shared wireless resources (e.g., one or more channels in a shared wireless band, such as a CBRS band) when the quality metric of the shared wireless resources does not exceed a threshold, provides non-QoS-sensitive services over the shared wireless resources regardless of whether the quality metric of the shared wireless band exceeds the threshold, and provides QoS-sensitive services at least partially over licensed wireless resources (e.g., one or more channels in a wireless band specifically licensed to the carrier) when the quality metric of the shared wireless resource exceeds the threshold. The shared wireless band and the licensed wireless band may be different bands.

In certain instances, the base station 102 is configured to perform carrier aggregation. For example, the base station 102 may provide QoS-sensitive services via an aggregated resource when the quality metric exceeds the threshold, wherein the aggregated resource includes one or more available channels in the licensed wireless resources as a primary carrier and one or more available channels in the shared wireless resources as a non-primary carrier (e.g., a secondary carrier). Thus, in certain embodiments, the base station 102 may provide QoS-sensitive services over both shared and licensed wireless resources when the quality metric exceeds the threshold.

In a specific example, base station 102 receives a request for GBR services (e.g., conversational voice services) from UE 110. The base station 102 checks the BER of a shared wireless resource (e.g., one or more channels in the shared wireless band). If the BER exceeds a threshold, the base station 102 can provide the GBR services to the UE 110 via a licensed wireless resource (e.g., at least one available channel in the licensed wireless band). In some instances, the base station 102 provides the GBR services to the UE 110 exclusively over one or more licensed wireless resources when the BER exceeds the threshold.

If, however, the BER does not exceed the threshold, the base station 102 can provide the GBR services to the UE 110 via at least one available channel in the shared wireless band. In some instances, the base station 102 provides the GBR services to the UE 110 exclusively via one or more available channels in the shared wireless band.

In another example, base station 102 receives a request for non-GBR services (e.g., internet browsing services) from UE 112. Regardless of the BER of the one or more channels in the shared wireless band, the base station 102 provides the non-GBR services to the UE 112 via at least one available channel in the shared wireless band. In some instances, the base station provides the non-GBR services to the UE 112 exclusively via one or more available channels in the shared wireless band.

In some instances, the environment 100 can further include one or more communication servers to facilitate communications by and between the various devices in the environment 100. The core network 114, for example, can include the one or more servers. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the environment 100 may implement GSM, UMTS, and/or LTE/LTE Advanced telecommunications technologies. The environment 100 may include, but is not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UEs 110 and 112, and one or more endpoints of the network (e.g., servers, websites, etc.). While FIG. 1 illustrates the example environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In some instances, the UEs 110 and 112 can communicate with any number of user equipment, servers, network devices, computing devices, and the like.

Figure 2:
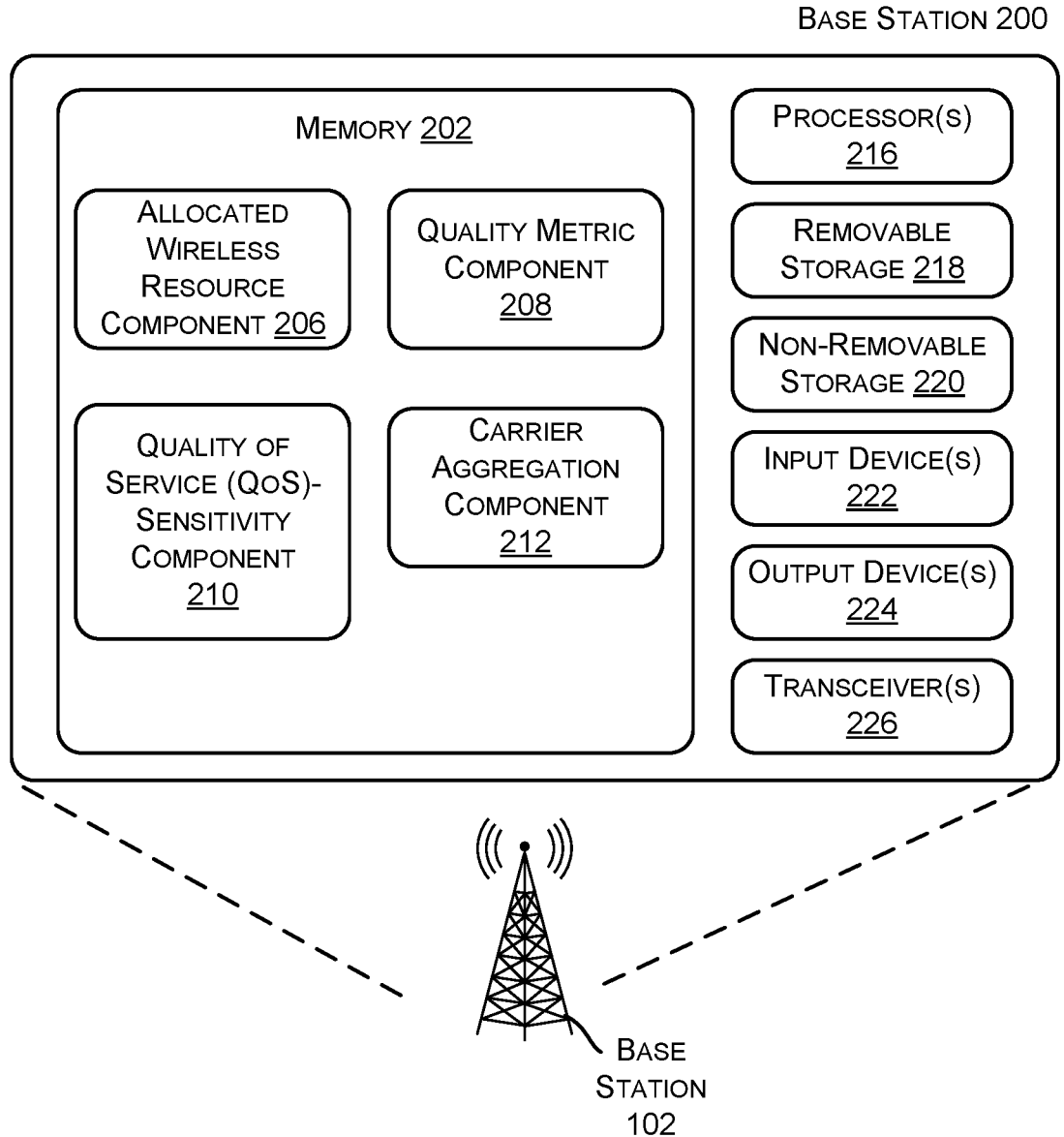
FIG. 2 illustrates an example base station configured to perform service-aware utilization of shared wireless resources, in accordance with embodiments of the present disclosure.

FIG. 2 illustrates an example base station 200 configured to perform service-aware utilization of shared wireless resources, in accordance with embodiments of the present disclosure. In some instances, the base station 200 illustrated in FIG. 2 corresponds to the base station 102 illustrated in FIG. 1. In the context of the present disclosure, the base station 200 can be implemented as a single device or as a plurality of devices over which components and data are distributed.

The base station 200 includes a memory 202. The memory can include, for example, an allocated wireless resource component 206, a quality metric component 208, a Quality of Service (QoS)-sensitivity component 210, a channel selection component 212, and a carrier aggregation component 214. The base station 200 further includes processor(s) 216, removable storage 218, non-removable storage 220, input device(s) 222, output device(s) 224, and transceiver(s) 226.

In various embodiments, the memory 202 is volatile (such as Random Access Memory (RAM)), non-volatile (such as Read-Only Memory (ROM), flash memory, etc.), or some combination of the two. The allocated wireless resource component 206, quality metric component 208, QoS-sensitivity component 210, channel selection component 214, and carrier aggregation component 212, which are stored in the memory 202, can comprise methods, threads, processes, objects, modules, applications or any other sort of executable instructions. The allocated wireless resource component 206, quality metric component 208, QoS-sensitivity component 210, and carrier aggregation component 214, which are stored in the memory 202 can also include files and databases.

In some embodiments, the allocated wireless resource component 206 includes functionality to store and/or track wireless resources allocated to the base station 200. For example, the allocated wireless resource component 206 can store indications of one or more wireless resources that have been allocated to the base station 200 by a network manager, e.g., network manager 114. In some instances, the allocated wireless resource component 206 can configure the base station 200 to operate using the one or more wireless resources by exchanging data with one or more UEs using the one or more wireless resources via transceiver(s) 226. In some instances, the allocated wireless resource component 206 can update the allocated wireless resource information as wireless resources are allocated and deallocated to and from the base station 200.

In various embodiments, the quality metric component 208 includes functionality to measure, track, and/or monitor a quality metric of one or more wireless resources. The wireless resources may include one or more wireless channels connecting the base station 200 and one or more devices. In some embodiments, the quality metric component 208 is used to measure the quality metric of at least one channel in a shared wireless band, e.g., a CBRS wireless band.

The quality metric component 208 can measure the quality metric in a variety of ways. For example, the quality metric component 208 may measure the BER of a channel by causing the transceiver(s) 226 to transmit a bit sequence over a particular channel to a receiving entity (e.g., a UE), determining a number of different bits between the bit sequence received by the receiving entity and the original transmitted bit sequence, and calculating the ratio of different bits to the total number of bits in the transmitted bit sequence. In some instances, the number of different bits are calculated by the receiving entity, and an indication of the number of different bits are received by the transceiver(s) 226.

In certain embodiments, the quality metric component 208 can calculate the quality metric by combining different performance measurements. For example, the quality metric component 208 may combine the BER of a wireless resource with a latency of the wireless resource. In some embodiments, the quality metric is an array containing different performance measurements. For example, a quality metric of a wireless resource can be represented by $[q_1, q_2, \ldots, q_n]$, where each of $q_1, q_2, \ldots, q_n$ is a different performance metric (e.g., BER, latency, a performance metric at a particular time, a maximum performance metric during a particular time period, etc.).

The quality metric component 208 can include functionality to aggregate and/or average the quality metrics of multiple channels, or multiple quality metrics of the same channel measured at different times. In some embodiments, the quality metric component 208 calculates the quality metric of a shared wireless band periodically, in response to receiving a request for services, or both.

The quality metric component 208 may further include functionality to assess the performance of a wireless resource by comparing the quality metric to a threshold. The threshold can be static or dynamic. The threshold can be preset by a service provider based on customer expectations. In some instances, the quality metric component 208 determines that the wireless resource is relatively overburdened, congested, and/or is inserting a certain amount of noise into transmissions when the quality metric exceeds the threshold. Like the quality metric, the threshold can be represented by a vector array. For example, the threshold can be represented by $[q^*_1, q^*_2, \ldots, q^*_n]$, where each of $q^*_1, q^*_2, \ldots, q^*_n$ is a threshold of a particular performance metric. In some instances, in which both the quality metric and the threshold are vector arrays, the quality metric component 208 determines that the quality metric exceeds the threshold when any value of the quality metric exceeds its corresponding value in the threshold, or when a certain number (e.g., all) of the values of the quality metric exceeds their corresponding values in the threshold array.

In various embodiments, the QoS-sensitivity component 210 includes functionality to determine whether a request for services is for QoS-sensitive services. For example, the base station 200 may receive a request for services via transceiver(s) 226, and may determine whether the request is for QoS-sensitive services by analyzing the request. In some instances, the request may be a data packet with one or more data fields indicating a type of services requested. In some instances, the QoS-sensitive component 210 may identify that a request is for QoS-sensitive services when the type of services requested is indicated in a predetermined list of QoS-sensitive services. The list of QoS-sensitive services can be stored locally at the base station 200. In certain embodiments, the QoS-sensitivity component 210 can be used to identify whether the type of services corresponds to a type of GBR services or a type of non-GBR services.

In some instances, the base station 200 may determine whether the request is for QoS-sensitive services by forwarding the request to a core network and receiving an indication that the request is for QoS-sensitive services from the core network. This indication can be one or more QoS-sensitive data packets, for example.

In various embodiments, the channel selection component 212 includes functionality to select one or more wireless channels via which to deliver services in response to a request for services. In some embodiments, the channel selection component 212 selects the one or more channels in shared wireless resources when the quality metric component 208 indicates that a quality metric of the shared wireless resources does not exceed a threshold, and/or when the QoS-sensitivity component 210 indicates that the request is for non-QoS-sensitive services. In certain embodiments, the channel selection component 212 selects at least one of the one or more channels in licensed wireless resources when the quality metric component 208 indicates that the quality metric of the shared wireless band(s) exceeds the threshold and the QoS-sensitivity component 210 indicates that the request is for QoS-sensitive services.

In some embodiments, the carrier aggregation component 212 includes functionality to perform carrier aggregation on multiple selected wireless resources. That is, the carrier aggregation component 212 can include functionality to aggregate (e.g., combine or use multiple) component carriers in one or more wireless resources (e.g., one or more frequency bands) to increase a bandwidth over which to provide services to one or more UEs. In some instances, the carrier aggregation component 212 can use contiguous component carriers (e.g., intra band), and in some instances, the carrier aggregation component 212 can use intra-band, non-contiguous carriers, or inter-band, non-contiguous carriers. In some instances, the carrier aggregation component 212 can aggregate carriers associated with the one or more wireless resources provided to the base station 200 to increase a bandwidth to a UE. For example, when the channel selection component 212 selects multiple wireless channels via which to deliver services, the carrier aggregation component 212 aggregates the multiple wireless channels.

In some embodiments in which the channel selection component 212 selects at least one channel in licensed wireless resources and at least one channel in shared wireless resources (e.g., when the quality metric of the shared wireless resources exceeds a threshold and the request is for QoS-sensitive services), the carrier aggregation component 212 generates an aggregated resource with the at least one channel in the licensed wireless resources as a primary component carrier and the at least one channel in the shared wireless resources as a non-primary (e.g., secondary) component carrier.

In some embodiments, the processor(s) 216 is a central processing unit (CPU), a graphics processing unit (GPU), or both CPU and GPU, or other processing unit or component known in the art.

The base station 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. The memory 202, the removable storage 218, and the non-removable storage 220 are all examples of computer-readable storage media. Computer-readable storage media include, but are not limited to, RAM, ROM, EEPROM, flash memory, or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the base station 200. Any such tangible computer-readable media can be part of the base station 200.

The base station 200 may be configured to communicate over a telecommunications network using any common wireless and/or wired network access technology. Moreover, the base station 200 may be configured to run any compatible device operating system (OS).

The base station 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the base station 200 also includes one or more wired or wireless transceiver(s) 226. For example, the transceiver(s) 226 can include a network interface card (NIC), a network adapter, a LAN adapter, or a physical, virtual, or logical address to connect to various network or the network manager 114 illustrated in the environment 100, for example. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMAX, Bluetooth, infrared communication, and the like.

Figure 3:
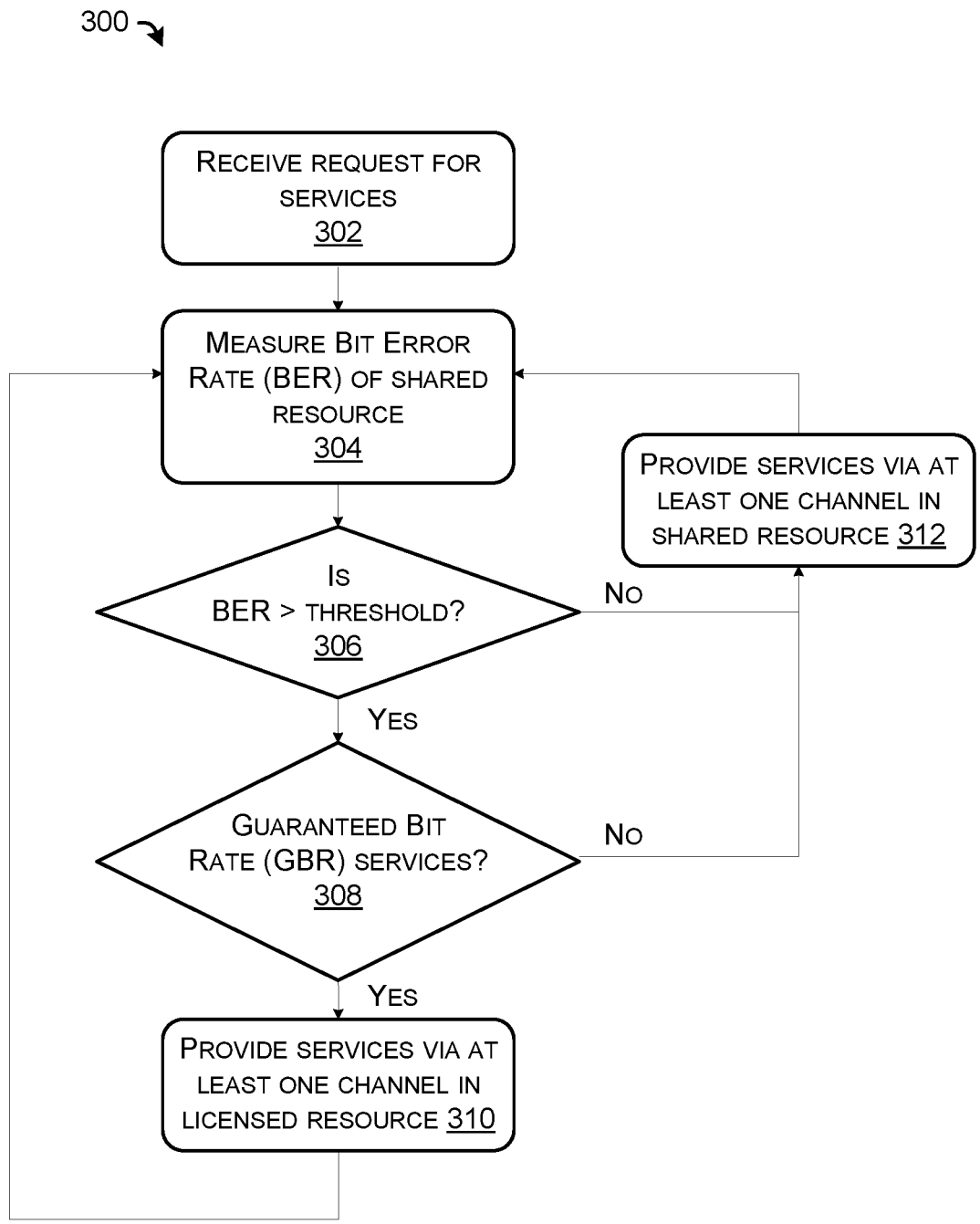
FIG. 3 illustrates an example process for delivering requested services over shared and/or licensed resources, in accordance with various embodiments of the present disclosure.
Figure 4:
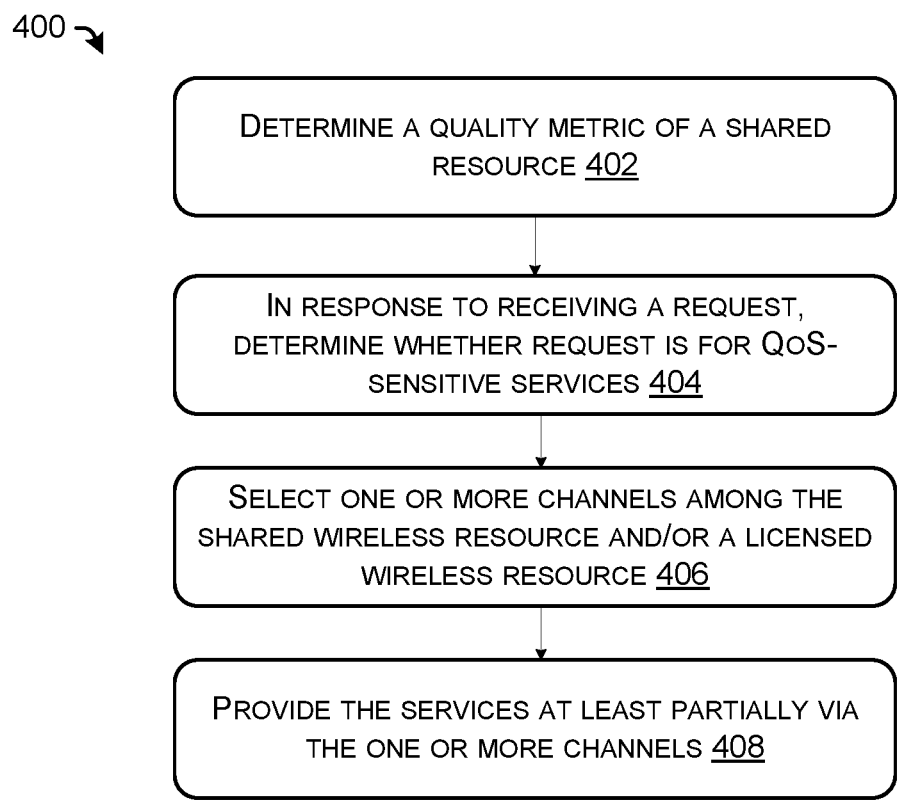
FIG. 4 illustrates an example process for delivering requested services over shared and/or licensed resources, in accordance with various embodiments of the present disclosure.

FIGS. 3 and 4 illustrate example processes in accordance with embodiments of the present disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel, and can be performed multiple times, to implement the processes.

FIG. 3 illustrates an example process 300 for delivering requested services over shared and/or licensed resources, in accordance with various embodiments of the present disclosure. The example process 300 can be performed by the base station 102 (or 200), in connection with other components discussed herein. Some or all of process 300 can be performed by one or more devices, equipment, or components illustrated in FIGS. 1 and 2, for example.

At operation 302, a request for services is received. The request can be received by a base station from a user equipment (UE) in a coverage area associated with the base station. In various embodiments, the request is a data packet including a header and a payload. In some examples, the request is received from the UE over a wireless link.

At operation 304, a bit error rate (BER) of a shared wireless resource is measured. The shared wireless resource may include one or more channels allocated and/or available to the base station within a shared wireless resource. For example, the base station can measure the BER of one or more channels in a CBRS band that have been allocated to the base station by a network manager and/or a Spectrum Access System (SAS).

At operation 306, the process 300 includes determining whether the BER exceeds a threshold. In some instances, operation 306 can be used to assess whether the shared wireless resource is relatively overburdened, congested, and/or likely to negatively impact QoS-sensitive traffic routed over the shared wireless resource. The BER can be calculated in response to receiving the request, periodically, or both. For example, the base station calculates the BER immediately after receiving a request for services. In some examples, the BER can be calculated by the base station at a predetermined frequency. For instance, the BER can be calculated by the base station at a predetermined frequency, and additionally in response to receiving a request for services.

The BER can be measured, for example, by causing transceiver(s) to transmit a bit sequence over a particular channel to a receiving entity, determining a number of different bits between the bit sequence received by the receiving entity and the original transmitted bit sequence, and calculating the ratio of different bits to the total number of bits in the transmitted bit sequence. In some instances, the number of different bits is calculated by the receiving entity, and an indication of the number of different bits are received by the transceiver(s) from the receiving entity.

If the BER is determined to exceed the threshold at operation 306, the process 300 continues to operation 308. At operation 308, the process 300 includes determining whether the request is for Guaranteed Bit Rate (GBR) services. In some instances, the base station determines whether the request is for GBR services by inspecting one or more data fields of the request. For example, the header and/or the payload of the request are inspected for an indication of the type of services being requested.

In some instances, the base station determines whether the request is for GBR services by forwarding the request to a core network, receiving one or more data packets associated with the services, and determining that the services are GBR services based on the one or more data packets.

If the request is determined to be for GBR services at operation 308, the process 300 continues to operation 310. At operation 310, the services are provided via at least one channel in a licensed resource. In some instances, the services are provided exclusively via one or more channels in a licensed wireless band. In some embodiments, the services are provided via an aggregated resource. For instance, the aggregated resource includes one or more channels in a licensed wireless band as a primary component carrier and one or more channels in a shared wireless band (e.g., a CBRS band) as a non-primary component carrier.

On the other hand, if the BER is determined to not exceed the threshold at operation 306, or if the request is determined to be for non-GBR services at operation 308, the process 300 continues to operation 312. At operation 312, the services are provided to the UE originating the request via at least one available channel in a shared resource. In some embodiments, the shared resource is a CBRS band. The at least one available channel in the CBRS band can include, for example, a General Authorized Access channel of the CBRS band. In some instances, the services are provided exclusively via the shared resource in operation 312, such that no licensed resources are utilized to deliver the services to the UE originating the request for the services.

Although not illustrated in FIG. 3, the one or more channels over which the services are provided in operations 310 or 312 can be allocated to the base station in advance. For example, the base station may additionally receive an indication from a network manager of at least one available channel in the shared resource and provide the services to the UE at operation 312 using the at least one available channel at operation 312.

In addition, although not illustrated in FIG. 3, the base station can receive other requests for services from the UE, or from a different UE, and independently select wireless resources over which to provide those services. For example, at the same time as performing process 300 with respect to a first request from a first user device, the base station can receive a second request for services from a second user device, determine whether the second request is for GBR services, and provide the requested services based on whether the BER of the shared resource exceeds the threshold and whether the second request is for GBR services.

FIG. 4 illustrates an example process 400 for delivering requested services over shared and/or licensed resources, in accordance with various embodiments of the present disclosure. The example process 400 can be performed by the base station 102 (or 200), in connection with other components discussed herein. Some or all of process 400 can be performed by one or more devices, equipment, or components illustrated in FIGS. 1 and 2, for example.

At operation 402, a quality metric of a shared wireless resource is determined. The quality metric can include, for example, a Bit Error Rate (BER) of at least one channel in the shared wireless resource. In some embodiments, the quality metric can be based at least in part on at least one feature of the shared wireless resource selected from BER, latency, throughput, goodput, and congestion. In various embodiments, the shared wireless resource is a CBRS band. In some instances, the quality metric is compared to a threshold. The threshold can be a predetermined threshold stored locally.

At operation 404, in response to receiving a request for services, the process 400 includes determining whether the request is for Quality of Service (QoS)-sensitive services. In some instances, the request is determined to be for QoS-sensitive services when it is for Guaranteed Bit Rate (GBR) services. However, in some embodiments, QoS-sensitive services can be defined differently. For example, the request may be determined to be for QoS-sensitive services when it is for services that are known to be sensitive to delays and/or errors during transmission, regardless of whether the services are guaranteed a bit rate during transmission. Although FIG. 4 illustrates operation 404 as following operation 402, in some embodiments, operation 404 is performed before operation 402.

At operation 406, one or more channels among the shared wireless resource and/or a licensed wireless resource are selected. In operation 406, the one or more channels may be selected based at least in part on the quality metric of the shared resource determined at operation 402 and whether the request is for QoS-sensitive services, as determined at operation 404. The one or more channels may include uplink and/or downlink channels.

In some examples, the one or more channels selected at operation 406 are exclusively in the shared wireless resource when the quality metric does not exceed the threshold and/or when the request is for non-QoS-sensitive services. However, in some examples, the one or more channels selected at operation 406 are at least partially selected in the licensed wireless resource when the quality metric exceeds the threshold and the request is for QoS-sensitive services.

In some instances, the one or more channels selected at operation 406 are exclusively in the CBRS band when a BER of the CBRS band does not exceed a predetermined threshold and/or when the request is for non-GBR services. However, in some examples, the one or more channels selected at operation 406 are at least partially selected in a licensed band when the BER exceeds the threshold and the request is for GBR-services.

At operation 408, the services are provided at least partially via the one or more channels selected at operation 406. In some instances, the services are provided via an aggregated resource including multiple channels as component carriers. For example, if multiple channels in the shared wireless resource are selected at operation 406, the multiple channels can be combined into an aggregated resource using channel aggregation, and the services are provided via the aggregated resource. In some examples, multiple channels selected at operation 406 can include at least one channel in the shared wireless resource and at least one channel the licensed wireless resource, and the services are provided via an aggregated resource including the at least one channel in the shared wireless resource and the at least one channel in the licensed wireless resource. For instance, the aggregated resource can include at least one channel in the licensed wireless resource as a primary component carrier and at least one channel in the shared wireless resource as a non-primary (e.g., secondary) component carrier.

In some embodiments, one or more operations in process 400 are performed repeatedly. For example, operations 402, 406, and 408 can be performed every time a request for services is received, periodically, or both.

In various embodiments, if the BER exceeds a threshold and the request is for GBR services, the one or more selected channels may include at least one channel in a licensed band. In some instances, in which the one or more selected channels are aggregated using carrier aggregation, the one or more selected channels may include at least one channel in the licensed band as a primary carrier and include at least one channel in the shared band as a non-primary carrier, when the BER exceeds the threshold and the request is for GBR services.

If, on the other hand, the BER does not exceed the threshold and/or the request is for non-GBR services, the one or more selected channels may include at least one channel in the shared band. In certain embodiments, in which the BER does not exceed the threshold and/or the request is for non-GBR services, the one or more selected channels are exclusively in the shared band, such that no channels are selected in a licensed band.

The services are provided via the one or more selected channels at operation 408. In various embodiments, the services are provided between a core network and a UE originating the request.

Thus, services can be delivered using wireless resources that are selected based at least in part on a current quality of the wireless resources and a sensitivity of the services to the quality of the wireless resources. In various embodiments, the use of licensed resources can be limited by primarily delivering the services to a requesting user device over shared resources without significantly impacting the quality of experience of the user of the device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a memory; and
   one or more components stored in the memory and executable by the one or more processors to perform operations comprising:
      determining whether a bit error rate (BER) of a shared wireless resource exceeds a threshold;
      receiving a request from a user device;
      determining that the request is for guaranteed bit rate (GBR) services;
      in response to determining that the BER of the shared wireless resource exceeds the threshold, providing the GBR services to the user device via a licensed wireless resource; and
      in response to determining that the BER of the shared wireless resource does not exceed the threshold, providing the GBR services to the user device via the shared wireless resource.

2. The system of claim 1, wherein the shared wireless resource is a Citizens Broadband Radio Service (CBRS) band.

3. The system of claim 1, wherein providing the GBR services to the user device via at the licensed wireless resource includes providing the GBR services via an aggregated resource including at least one channel of the licensed wireless resource as a primary component carrier and at least one channel of the shared wireless resource as a non-primary component carrier.

4. A method comprising:
   determining that a bit error rate (BER) of a shared wireless resource exceeds a threshold;
   receiving a request from a user device;
   determining that the request is for guaranteed bit rate (GBR) services;
   based at least in part on determining that the BER of the shared wireless resource exceeds the threshold, providing the GBR services to the user device via a licensed wireless resource; and
   subsequent to the providing,
      determining that the BER of the shared wireless resource does not exceed the threshold; and
      in response to determining that the BER of the shared wireless resource does not exceed the threshold, providing the GBR services to the user device via the shared wireless resource.

5. The method of claim 4, wherein determining that the BER of the shared wireless resource exceeds the threshold includes:
   periodically calculating the BER of the shared wireless resource; and
   determining that the BER of the shared wireless resource exceeds a predetermined threshold.

6. The method of claim 4, wherein receiving the request from the user device includes receiving the request from the user device over a wireless link.

7. The method of claim 4, wherein determining that the request is for GBR services includes determining the request is for at least one of conversational voice services, conversational video services, real-time gaming services, non-conversational video services, Push To Talk (PTT) voice services, or Vehicle-to-X (V2X) services.

8. The method of claim 4, wherein the shared wireless resource is a Citizens Broadband Radio Service (CBRS) band.

9. The method of claim 4, wherein providing the GBR services to the user device via the licensed wireless resource includes providing the GBR services via an aggregated resource including at least one channel of the licensed wireless resource as a primary component carrier and at least one channel of the shared wireless resource as a non-primary component carrier.

10. The method of claim 4, the request being a first request, the user device being a first user device, the method further comprising:
    receiving a second request from a second user device;
    determining the second request is for non-GBR services; and
    providing the non-GBR services to the second user device via the shared wireless resource.

11. The method of claim 10, wherein the shared wireless resource is a Citizens Broadband Radio Service (CBRS) band, and
    wherein providing the non-GBR services to the second user device via the shared wireless resource includes providing the non-GBR services to the second user device via at least one General Authorized Access (GAA) channel of the CBRS band.

12. The method of claim 10, wherein providing the non-GBR services to the second user device via the shared wireless resource includes exclusively providing the non-GBR services to the second user device via the shared wireless resource.

13. The method of claim 4, wherein providing the GBR services to the user device via the shared wireless resource includes:
    receiving an indication of at least one available Citizens Broadband Radio Service (CBRS) channel from a network manager; and
    providing the GBR services to the user device via the at least one available CBRS channel.

14. The method of claim 4, wherein providing the GBR services to the user device via the shared wireless resource includes exclusively providing the GBR services to the user device via the shared wireless resource.

15. A non-transitory computer-readable medium storing one or more components executable by one or more processors to perform operations comprising:
    determining whether a bit error rate (BER) of a shared wireless resource exceeds a threshold;
    receiving a request from a user device;
    determining that the request is for guaranteed bit rate (GBR) services;
    in response to determining that the BER of the shared wireless resource exceeds the threshold, providing the GBR services to the user device via a licensed wireless resource; and
    in response to determining that the BER of the shared wireless resource does not exceed the threshold, providing the GBR services to the user device via the shared wireless resource.

16. The non-transitory computer-readable medium of claim 15, wherein determining that the request is for GBR services includes determining the request is for at least one of conversational voice services, conversational video services, real-time gaming services, non-conversational video services, Push To Talk (PTT) voice services, or Vehicle-to-X (V2X) services.

17. The non-transitory computer-readable medium of claim 15, wherein the request is a first request and the user device is a first user device, and the operations further comprise:
    receiving a second request from a second user device;
    determining the second request is for non-GBR services; and
    providing the non-GBR services to the second user device via the shared wireless resource.

18. The non-transitory computer-readable medium of claim 17, wherein the shared wireless resource is a Citizens Broadband Radio Service (CBRS) band, and
    wherein providing the non-GBR services to the second user device via the shared wireless resource includes providing the non-GBR services to the second user device via at least one General Authorized Access (GAA) channel of the CBRS band.

* * * * *